(12) United States Patent
Alhussan

(10) Patent No.: US 12,080,940 B1
(45) Date of Patent: Sep. 3, 2024

(54) FLYING ANTENNA VEHICLE SYSTEM AND METHOD OF USE

(71) Applicant: Khaled Abdullah Alhussan, Riyahdh (SA)

(72) Inventor: Khaled Abdullah Alhussan, Riyahdh (SA)

(73) Assignee: Richard Eldredge, Grand Prairie, TX (US)

(*) Notice: Subject to any disclaimer, the term of this patent is extended or adjusted under 35 U.S.C. 154(b) by 763 days.

(21) Appl. No.: 15/970,357

(22) Filed: May 3, 2018

Related U.S. Application Data

(60) Provisional application No. 62/661,436, filed on Apr. 23, 2018.

(51) Int. Cl.
*H01Q 1/28* (2006.01)

(52) U.S. Cl.
CPC ........... *H01Q 1/28* (2013.01); *B64U 2201/10* (2023.01)

(58) Field of Classification Search
CPC ........................................................ H01Q 1/28
See application file for complete search history.

(56) References Cited

U.S. PATENT DOCUMENTS 2,995,740 A * 8/1961 Shreckengost ....... B64C 39/022
342/58

* cited by examiner

*Primary Examiner* — Graham P Smith
(74) *Attorney, Agent, or Firm* — Richard Eldredge; Eldredge Law Firm

(57) ABSTRACT

A flying antenna system includes a platform having an upper surface and a lower surface; a rotor secured to the upper surface of the platform, the rotor is configured to provide vertical lift; an antenna secured to the platform and configured to transmit a signal; and a power source configured to provide power to the rotor and the antenna.

6 Claims, 4 Drawing Sheets

FLYING ANTENNA VEHICLE SYSTEM AND METHOD OF USE

BACKGROUND

1. Field of the Invention

The present invention relates generally to flying antenna vehicle systems and methods of use.

2. Description of Related Art

Systems and methods to transmit signals are well known in the art. FIG. 1 is a front view of a conventional antenna tower 101 configured to send a signal via an antenna 103 supported at a height relative to the ground surface 107 via a structure 105. Although effective in most applications, it should be understood that antenna tower 101 has limitations. For example, the tower 101 is limited in its height, which in turn reduces the signal strength to reach one or more intended receivers.

Accordingly, although great strides have been made in the area of systems and methods to transmit signals, many shortcomings remain. It is believed that the present invention overcomes one or more of the limitations of conventional signal towers as will be described below.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
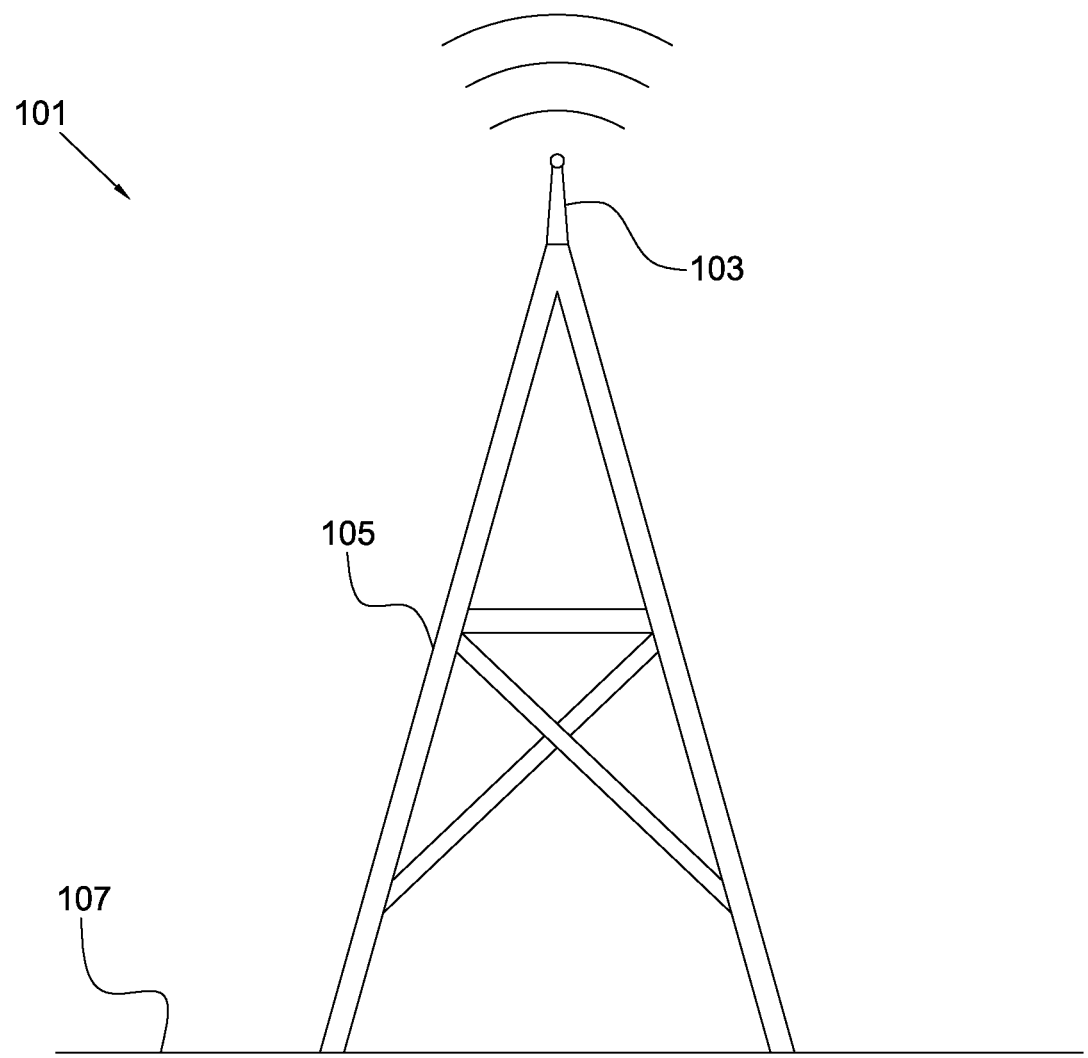
FIG. 1 is a side view of a conventional antenna tower.
Figure 2:
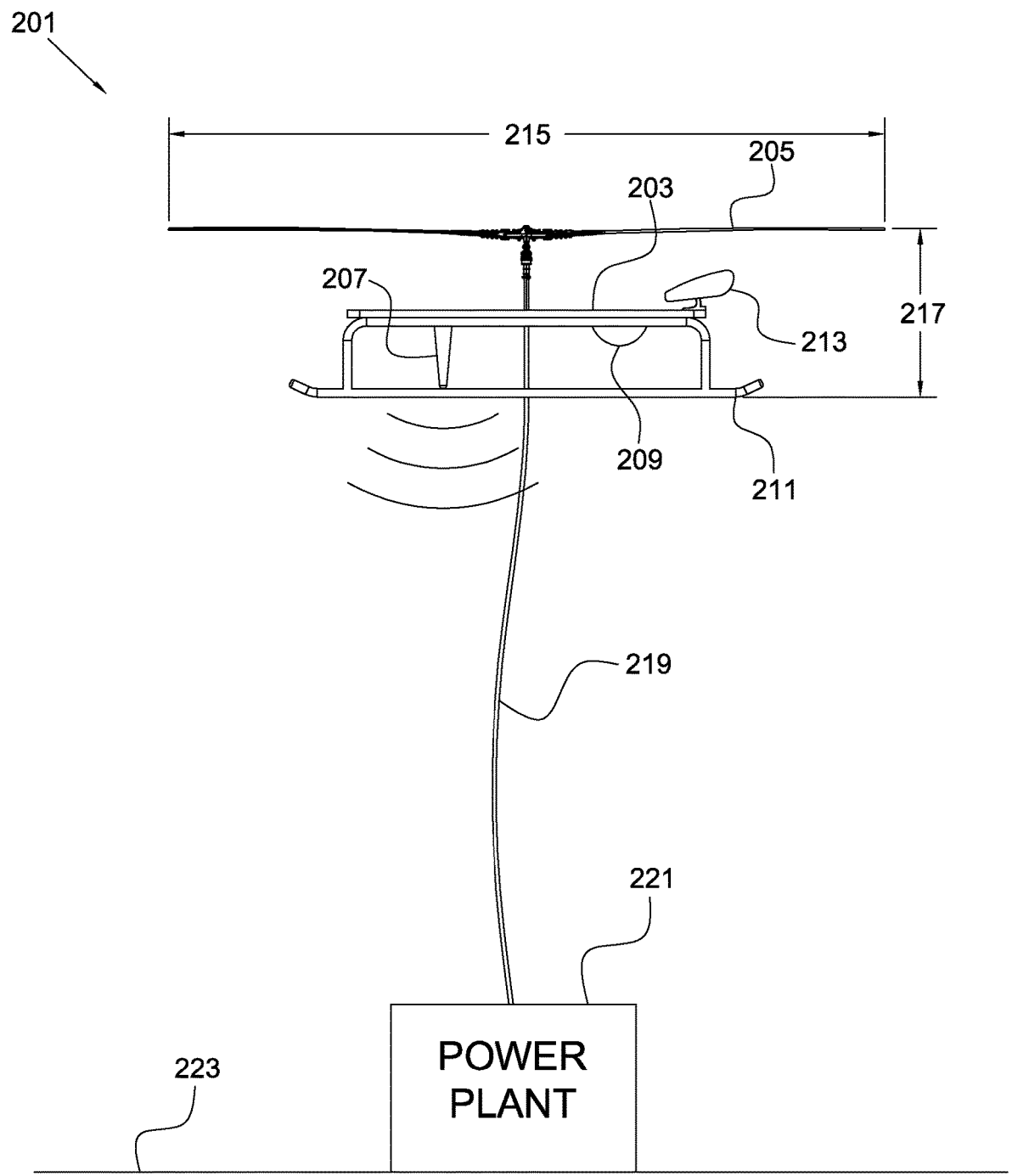
FIG. 2 is a side view of a system in accordance with a preferred embodiment of the present application.
Figure 3:
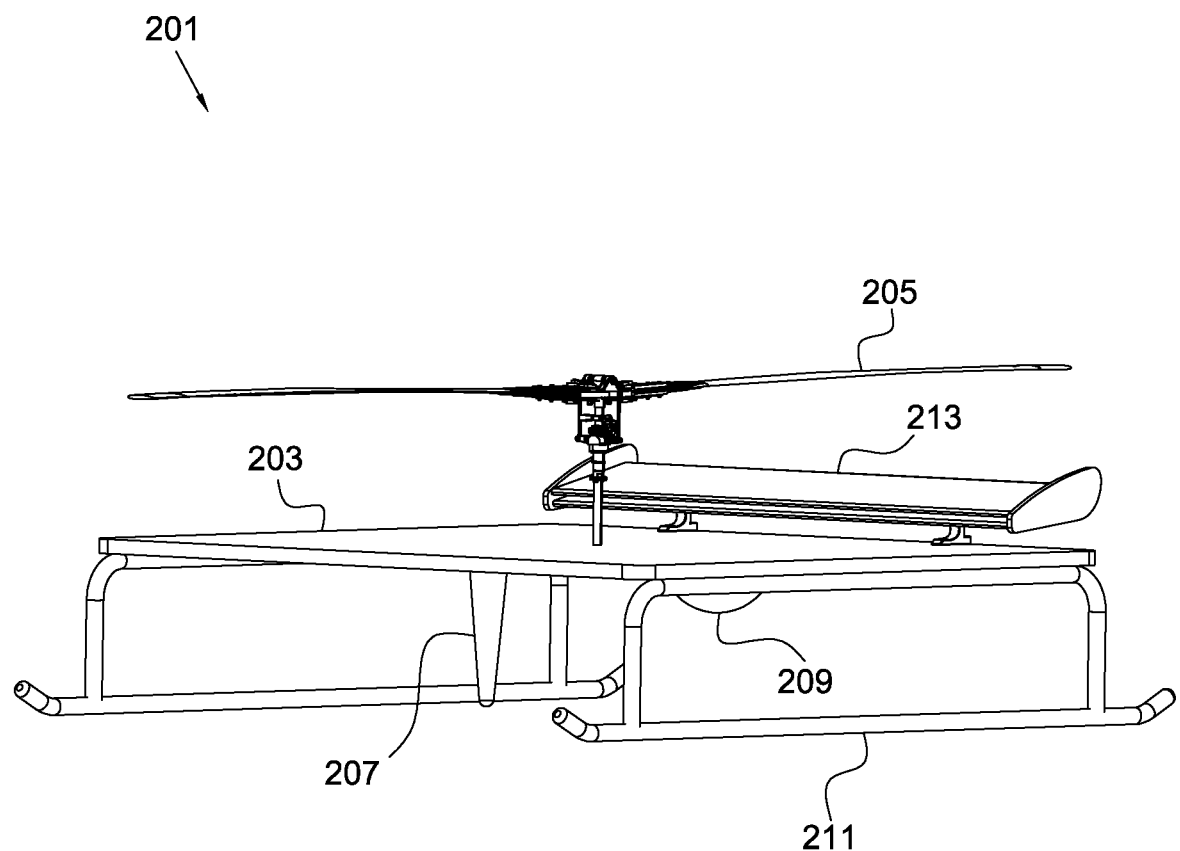
FIG. 3 is an oblique view of the system of FIG. 2.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-5 depicts various views of a flying antenna system 201 in accordance with one preferred embodiment of the present application. It will be appreciated that aircraft 201 overcomes one of more of the above-listed problems commonly associated with conventional aircraft.

Figure 4:
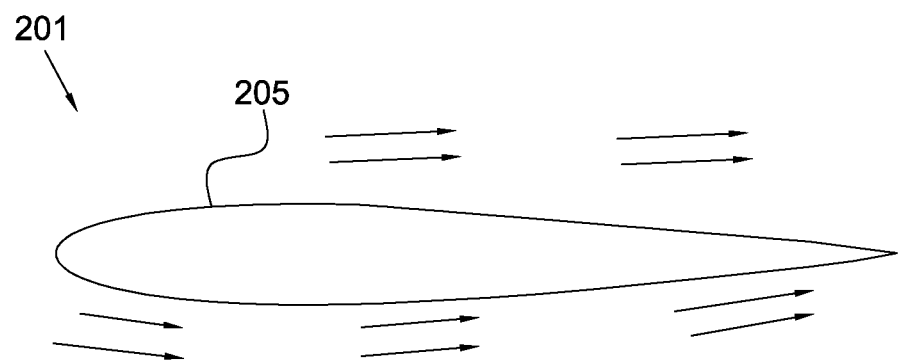
FIG. 4 is a cross-sectional side view of a spoiler of the system of FIG. 2.

In one preferred embodiment, system 201 includes an elongated hovering platform 203 with a rotor 205 secured thereto. During use, the rotor is configured to elevate the platform at a height relative to the ground surface 223. In one exemplary embodiment, a plurality of rotor systems could be utilized to move the rotor hub up and down relative to the platform. The rotor changes it position up and down for takeoff and landing and does not include a variable blade pitch or angle of incidence to make it less mechanically complex. Accordingly, in the preferred embodiment the blades are rigidly attached to the hub, and the hub moves up and down along with the rotor through sliding surfaces or servomotors. In one embodiment, it is contemplated utilizing NAC0012 airfoils for the blade and the blade span 215 that is 4 times the vertical length of the carrier. The cross-sectional view of the blade 205 is shown in FIG. 4 with a plurality of arrows indicating flow direction around the blade.

It should be appreciated that alternative embodiments could utilized a lifting system other than a rotor assembly. For example, a contemplated embodiment could utilize jet propulsion and/or other similar means to create lift and flight.

System 201 is further provided with an antenna 207 and a communication system 209 secured to a bottom surface of the platform 203 that is configured to transmit a signal to one or more intended receivers. One of the unique features believed characteristic of the present invention is the ability to elevate the antenna and communication system at a height relative to the ground surface via the rotor and platform. This feature allows the system to propagate the communication signals, for example, in a deserted area of in far sea locations.

The system 201 is further provided with one or more legs 211 secured to and extending from the lower surface of the platform 203 at a position 217 relative to the rotor blade 205. During use, the legs 211 are configured to provide landing support. A spoiler 213 is secured to the upper surface of the platform and is configured to stabilize the platform in strong wind conditions.

The system 201 includes a power plant 221 configured to power the rotor 215 and devices associated with system 201 during use. The power plant 221 is secured to the one or more electrical devices via a cable 219. It will be appreciated that it is also contemplated having the power source carried by the system, as shown in FIG. 5.

Figure 5:
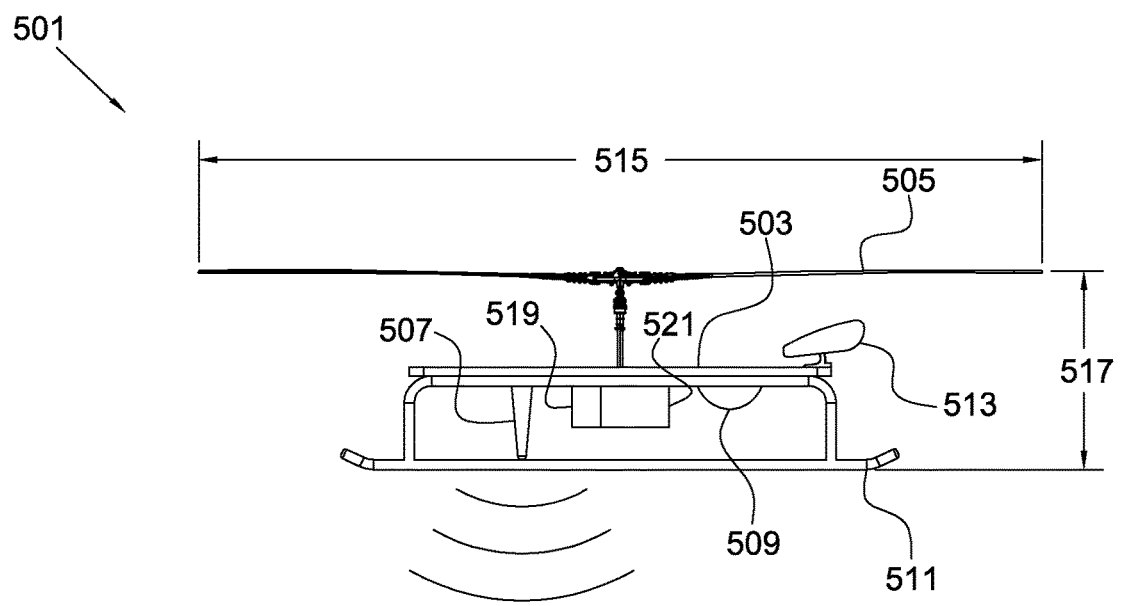
FIG. 5 is an alternative embodiment of the present invention.

In FIG. 5, a side view of a system 501 is shown. It will be appreciated that the features of system 501 are substantially similar in form and function to the features discussed above with respect to system 201. System 501 is further provided with a power source 521 secured to the platform 503 and configured to power one or more servo motors 519, antenna 507, and communication device 509. The system is further provided with a rotor 505 having a length 511 and at a height 517 relative to the legs 511. A spoiler 513 is also utilized to stabilize the system during flight.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A flying antenna system, comprising:
   a platform having an upper surface that extends from a front end to a back and from a first side end to a second side end, the upper surface being substantially flat between the front end, the back end, the first side and, and the second side end and a lower surface;
   a rotor secured to the upper surface of the platform, the rotor is configured to provide vertical lift;
   an antenna secured to the platform and configured to transmit a signal;
   a spoiler attached to the upper surface and having a curved top surface, the curve extending completely from a leading edge to a trailing edge of the spoiler;
   a first leg attached to the platform and running at least a length of the platform;
   a second leg attached to the platform and running at least the length of the platform; and
   a power source configured to provide power to the rotor and the antenna.

2. The system of claim 1, further comprising:
   a communication system secured to the platform.

3. The system of claim 2, wherein the communication system is secured to the lower surface of the platform.

4. The system of claim 1, wherein the power source is secured to the platform.

5. The system of claim 1, wherein the power source is positioned at a distance from the platform.

6. The system of claim 5, further comprising:
   a cable conductively coupled to the power source and the antenna.

* * * * *